United States Patent

[11] 3,585,875

| [72] | Inventor | Frederick J. Adams<br>Campton, England |
|---|---|---|
| [21] | Appl. No. | 882,065 |
| [22] | Filed | Dec. 4, 1969 |
| [45] | Patented | June 22, 1971 |
| [73] | Assignee | Cam Gears Limited<br>Hitchin, England |

[54] RACK AND PINION ASSEMBLY
11 Claims, 5 Drawing Figs.

[52] U.S. Cl. ............................................. 74/422, 74/29
[51] Int. Cl. ....................................... F16h 1/04, F16h 19/04
[50] Field of Search .......................................... 74/29, 422, 388 PS

[56] References Cited
UNITED STATES PATENTS

| 2,168,215 | 8/1939 | Keitel | 74/422 |
|---|---|---|---|
| 2,883,875 | 4/1959 | Davidson | 74/422 |
| 3,157,061 | 11/1964 | Parker | 74/422 |
| 2,467,066 | 4/1949 | Wilson | 74/422 |
| 3,352,170 | 11/1967 | Adams | 74/422 |

FOREIGN PATENTS

| 555,924 | 4/1957 | Belgium | 74/422 |

*Primary Examiner*—William F. O'Dea
*Assistant Examiner*—Wesley S. Ratliff, Jr.
*Attorney*—Hill, Sherman, Meroni, Gross and Simpson

ABSTRACT: A rack and pinion assembly, especially suited for automotive steering linkages, having at least one yoke member slidably supporting the rack bar on the side remote from the rack, and preferably directly opposite that portion of the rack engaging the pinion, wherein the yoke is urged against the rack bar by a spring biased slipper in wedge-fitting, sliding relationship with the yoke. The slipper and yoke have inclined mating surfaces which establish a nonreversing wedge angle relationship so that the spring bias need only be sufficient to take up looseness and wear without supporting the load on the yoke.

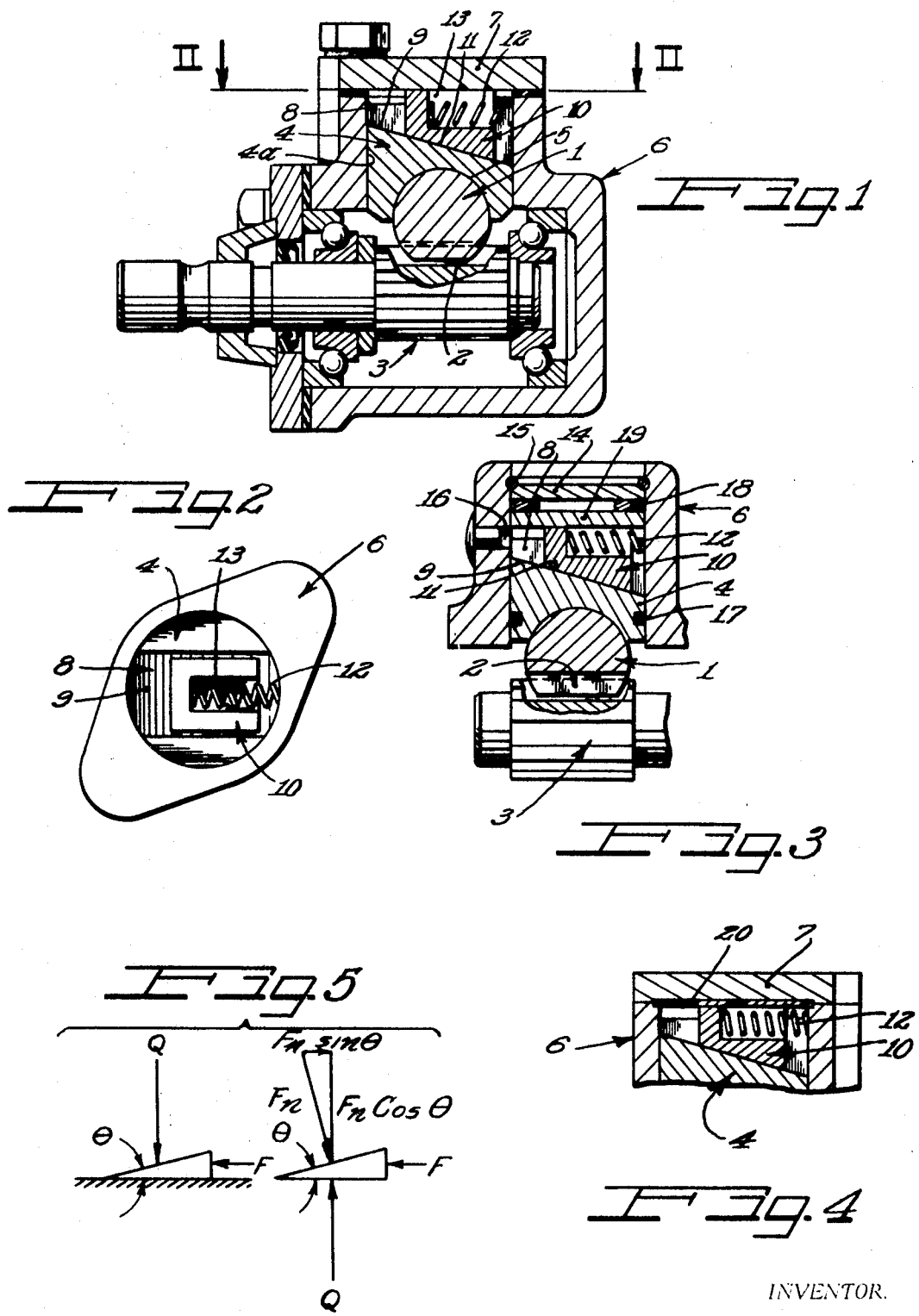

RACK AND PINION ASSEMBLY

BACKGROUND OF THE INVENTION

1. Field of the Invention

This invention relates to the art of rack and pinion assemblies for automotive steering linkages and the like, and specifically deals with the supporting of rack bars in assemblies to eliminate lost motion and automatically compensate for wear.

2. Description of the Prior Art

Supporting yolks or saddles for the rack bars of rack and pinion assemblies have been resiliently urged against the rack bar by springs, as in U.S. Pat. No. 3,347,109 dated Oct. 17, 1967, or by rubber blocks, as in British Pat. No. 892,683 published Mar. 28, 1962. Such resilient supports must be adequate enough to maintain the yoke or saddle in good bearing engagement with the rack bar and to maintain the rack in proper meshed condition with the pinion. Shim adjustments or adjusting screws have been required in such installations to properly load the wear takeup means so that variations in tolerances of the components might be accommodated.

SUMMARY OF THE INVENTION

The present invention now provides a wedge support for the yokes or bearing saddles of rack and pinion assemblies. This wedge support is spring-biased to compensate for wear between the yoke and rack bar, but the spring load does not carry the bearing load because the wedge angle is such that the wedge support will remain in position even when loaded by a large force. The supporting wedge, even when loaded with a very light spring, will not slip backward under bearing loads imposed on it by the yoke or saddle which it supports.

The degree of irreversibility of the wedge is thus controlled by the angle of wedge slope and by the strength of the biasing spring. The biasing spring is primarily a wear takeup means and not a support means.

The yokes or saddles are preferably molded plastics material such as nylon, "Teflon" (polytetrafluoroethylene,) and the like. The wedge member or slipper coacting with the yoke or saddle may also be composed of the same plastics material. It should be understood, however, that either the yoke or the slipper, or both, can be metal, such as steel.

A feature of the invention includes the provision of a resilient cushion between the yoke member, its housing, or the slipper, so that under shock conditions the yoke and slipper can move slightly in a direction away from the pinion without causing the slipper to back off the yoke. The resilient cushion material may be rubber or a plastics material such as "Microvon" (a trademark of Rubber Plastics Ltd. for a micro cellular polyurethane rubber.)

It is then an object of this invention to provide a rack and pinion assembly with a rack bar supporting yoke carried on a wedge which will maintain the yoke in good bearing engagement with the rack bar and will maintain the rack in meshed engagement with the pinion.

Another object of this invention is to provide a spring-biased wedge slipper support for the yoke or saddle of the rack bar in a rack and pinion assembly.

Another object of this invention is to provide a bearing support for a rack bar of a rack and pinion assembly which will accommodate wide tolerance variations, will take up all looseness in the components, and will automatically compensate for wear while solidly supported on a spring-biased wedge slipper that will not back off under heavy loads.

Another object of the invention is to provide spring-biased wedge takeup for the supporting yokes of rack bars in rack and pinion assemblies only requires a slight spring bias to take up wear and to prevent movement of the wedge out of tight fitting engagement with the yoke.

A still further object of this invention is to provide some resilience in a wedge supported bearing for the rack bar of a rack and pinion assembly.

Another object of the invention is to provide a wedge support for the bearing yoke of the rack bar in a rack and pinion assembly which has an irreversible wedge angle relationship with the yoke.

Other and further objects of this invention will be apparent to those skilled in this art from the following detailed description of the annexed sheet of drawings which, by way of preferred examples only, illustrates several embodiments of the invention.

BRIEF DESCRIPTION OF THE DRAWINGS

FIG. 1 is a cross-sectional view taken transversely to the longitudinal axis of the rack bar of a rack and pinion assembly according to this invention;

FIG. 2 is a cross-sectional view taken generally along the line II–II of FIG. 1 and showing the yoke and wedge slipper in bottom plan view;

FIG. 3 is a fragmentary view similar to FIG. 1, but illustrating a modified form of the invention;

FIG. 4 is a fragmentary cross-sectional view of a still further modified form of the invention;

FIG. 5 is a pair of diagrammatic views illustrating the wedge action of the invention.

DESCRIPTION OF THE PREFERRED EMBODIMENTS

As shown in FIGS. 1 and 2, a part cylindrical rack bar 1 has a rack 2 engaging a pinion 3 so that axial rotation of the pinion will drive the rack bar longitudinally over the pinion. A yoke or saddle member 4 has a part cylindrical recess 5 complementary to and seated on the cylindrical surface of the rack bar 1 at a position directly opposite the position at which the rack 2 engages the pinion 3. The yoke member 4 is cylindrical and has its cylindrical surface 4a extending in a plane normal to the plane of the rack 2 when the yoke member is seated on the rack bar, and this plane intersects the longitudinal axis of the rack bar 1.

The yoke member 4 is slidably mounted in the cylindrical bore of a housing 6 for the rack and pinion assembly. An end plate 7 closes the end of the cylindrical chamber portion of the housing 6. As shown, the housing rotatively mounts the pinion is ball bearings, and the pinion shaft projects through the housing.

The yoke 4 on the end thereof remote from the bearing recess 5 has a channel 8 extending diametrically thereacross with an inclined floor or bottom 9. The surface of the floor 9 is in a plane inclined relative to the plane of the rack 2.

A slipper member 10 is slidably mounted in the channel 8 between the floor 9 and the end plate 7, and this slipper member has an inclined surface 11 mating with the floor 9.

A coil spring 12 bottomed at one end against the housing 6 has its other end received in a recess 13 of the slipper 10. This spring 12 biases the slipper 10 upwardly on the inclined floor 9 of the yoke member 4.

It will be apparent from FIG. 1 that the slipper member 10 and the yolk member 4 are in wedge relationship, with the inclined surfaces 9 and 11 sliding over each other, thereby causing the yoke to be biased in a direction urging the rack 2 and pinion 3 in meshed engagement. Since the slipper 10 is constantly spring biased towards the rack and pinion into engagement, the arrangement eliminates all mechanical lost motion between the components and automatically compensates for wear between the components. The degree of irreversibility of the slipper 10 is controlled by the angle of slope of the engaging inclined surfaces 9 and 11 relative to the plane, which includes the rack 2, by the strength of the spring.

The angle of inclination of the mating surfaces 9 and 11 is such as to multiply the applied force of the spring 12 and to change the direction in which it acts.

In the diagrams of FIG. 5 the force F represents the spring-applied bias 12, and Q is the larger force to be exerted on the yoke member 4. Disregarding friction, the forces must act normal to their surfaces so that the actual force on the inclined surface is not Q, but a larger force $F_n$. Summing up the forces in the horizontal and vertical directions shows that:

$$F_n \sin \theta - F = 0$$

and $$Q - F_n \cos \theta = 0.$$

Combining the expressions for F and Q and solving for F gives:

$$F = Q \tan \theta.$$

If the angle $\theta$ is small, the reaction of Q against F is exceeded by the friction between the face of the wedge and the adjacent body on which it rests, and the wedge will remain in position even when loaded by the large force Q.

The wedge angle relationship of the slipper and yoke is such as to maintain a small angle $\theta$, and the load impose on the yoke 4 by the rack bar 1 will not slide the slipper 10 even though the load is materially greater than the spring bias. The wedge angle relationship may vary depending on the coefficient of friction between the floor 9 and the inclined surface 11 of the slipper. In general, an angle of inclination (angle $\theta$) of from 10°—20° is especially useful.

In the embodiment of FIG. 1 the coacting yoke 4, slipper 10, and end plate 7 form a relatively rigid stack supporting the rack bar 1.

In the modification shown in FIG. 3, parts identical with parts described in FIGS. 1 and 2 have been marked by the same reference numeral. However, as shown in FIG. 3, the end plate 7 of the FIG. 1 embodiment is replaced with a disc 14 retained in the housing 6 by an annular spring clip 15 seated in a complementary recess in the cylindrical bore of the housing which slidably mounts the yoke 4. The slipper 10 may be made of mild steel, and a lubrication port 16 is provided in the housing communicating with the engaging inclined surfaces 9 and 11. An O-ring seal 17 is provided in a groove around the yoke 4 to seal lubricant in the cylindrical chamber portion of the housing which receives the slipper member.

A plunger (not shown) can be inserted through the port 16 during assembly to urge the slipper member 10 to the right, as shown in FIG 3, thereby releasing pressure from the yoke 4 to allow the yoke to move away from the rack bar 1 and permit easy assembly of the rack and pinion.

The slipper 10 may be seated directly against the closure disc 14, as in the FIG. 1 embodiment, or, as illustrated in FIG. 3, a resilient ring 18 may be interposed between the disc 14 and a second disc 19 overlying the slipper 10 and slidable in the housing 6. This ring 18 not only acts as a seal for lubricant in the housing, but also provides a cushioning for the yoke 4 and slipper 10 against chock forces.

In the embodiment of FIG. 4, parts identical with parts described in FIGS. 1 and 2 have also been marked with the same reference numerals. In FIG. 4, however, the cushioning against the shock forces is accomplished without the use of the auxiliary disc 19. In FIG. 4 a disc 20 of cushion material is interposed between the closure plate 7 and the slipper 10. This resilient disc 20 is preferably made of a plastic such as "-Microvon," and not only cushions the slipper against the shock forces, but eliminates rattling of the assembly.

From the above-descriptions it will, therefore, be understood that this invention now provides wedge-type takeup and wear compensating means for rack and pinion assemblies.

I claim as my invention:

1. A rack and pinion assembly having a housing rotatably mounting a pinion and receiving a rack bar therethrough with a rack in meshed engagement with the pinion, a yoke slidably mounted in the housing on the side of the rack bar remote from the rack and slidably supporting the rack bar, said yoke member having an abutment surface inclined relative to the plane of the rack and on the end thereof remote from the rack bar, a wedge-shaped slipper member in said housing having an abutment surface mating with the inclined surface of the yoke, means closing the housing confining the slipper member against the yoke, and spring means biasing said slipper member up the inclined surface of the yoke to hold the yoke against the rack bar and the rack in meshed engagement with the pinion.

2. In a rack and pinion assembly including a housing rotatably mounting a pinion and receiving a rack bar therethrough with a rack in meshed engagement with the pinion and a yoke slidably mounted in the housing having a recess slidably supporting the rack bar on the side thereof remote from the pinion, the improvement of a wedge member slidable in the housing in wedge relationship with the yoke for urging the yoke against the rack bar, and spring means biasing said wedge to take up looseness and compensate for wear of the yoke and parts supported thereby.

3. The rack and pinion assembly of claim 1 where the angle of inclination of the mating wedge surfaces is from 10°—20° and the spring bias load is less than the load supported by the wedge slipper.

4. The assembly of claim 1 wherein the slipper member has a channel receiving the spring.

5. The assembly of claim 1 wherein the slipper member is composed of a plastics material.

6. The assembly of claim 1 wherein the slipper member is bottomed on a resilient cushion to accommodate slight movement of the yoke under shock loads imposed on the rack and pinion.

7. The assembly of claim 1 wherein a resilient cushion is interposed between the closed end of the housing and the slipper member capable of absorbing shock loads.

8. The assembly of claim 1 wherein the housing has a port accommodating insertion of a probe to release the wedge.

9. The assembly of claim 1 wherein the housing space between the yoke and closed end is sealed to retain lubricant.

10. The assembly of claim 2 wherein the wedge is a slipper having a flat bottom and a wedge surface inclined at a wedge angle relative to said bottom.

11. The assembly of claim 2 wherein the wedge locks the yoke member against movement away from the rack bar.

UNITED STATES PATENT OFFICE
CERTIFICATE OF CORRECTION

Patent No. 3,585,875          Dated    June 22, 1971

Inventor(s)   Frederick John Adams

It is certified that error appears in the above-identified patent and that said Letters Patent are hereby corrected as shown below:

Column 1, line 9, after "in" insert --rack and pinion--;
Column 1, line 12, cancel "yolks" and insert --yokes--;
Column 1, line 49, after "off" insert --of--;
Column 1, line 68, after "provide" insert --a--;
Column 1, line 70, after "assemblies" insert --which--;

Column 2, line 57, cancel "yolk" and insert --yoke--;
Column 3, line 14, cancel "impose" and insert --imposed--;
Column 3, line 48, cancel "chock" and insert --shock--.

Signed and sealed this 8th day of February 1972.

(SEAL)
Attest:

EDWARD M. FLETCHER, JR.            ROBERT GOTTSCHALK
Attesting Officer                  Commissioner of Patents